US012654982B2

(12) United States Patent
 Ziv

(10) Patent No.: US 12,654,982 B2
(45) Date of Patent: Jun. 16, 2026

(54) REINFORCED SPOOL ASSEMBLY

(71) Applicant: HORNLING INDUSTRIAL INC.,
 Tainan City (TW)

(72) Inventor: Avraham Ziv, Calabasas, CA (US)

(73) Assignee: HORNLING INDUSTRIAL INC.,
 Tainan City (TW)

( * ) Notice: Subject to any disclaimer, the term of this
 patent is extended or adjusted under 35
 U.S.C. 154(b) by 274 days.

(21) Appl. No.: 17/876,720

(22) Filed: Jul. 29, 2022

(65) Prior Publication Data

US 2023/0053255 A1      Feb. 16, 2023

Related U.S. Application Data

(60) Provisional application No. 63/232,709, filed on Aug.
 13, 2021.

(51) Int. Cl.
 *B65H 75/44* (2006.01)
 *B60R 22/34* (2006.01)
 *B60R 22/46* (2006.01)
 *B65H 75/18* (2006.01)
 *B65H 75/26* (2006.01)

(52) U.S. Cl.
 CPC ......... *B65H 75/4428* (2013.01); *B60R 22/46*
 (2013.01); *B65H 75/185* (2013.01); *B65H*
 *75/26* (2013.01); *B60R 2022/3402* (2013.01);
 *B60R 2022/468* (2013.01)

(58) Field of Classification Search
 CPC . B65H 75/4428; B60R 22/34; B60R 22/3413;
 B60R 2022/3427; B60R 22/28; B60R
 22/341; B60R 2022/286; B60R 2022/287;
 B60R 2022/288; B60R 2022/3402; B60P
 7/083; B60P 7/0846

USPC ...................................... 242/370, 376, 118.31
See application file for complete search history.

(56) References Cited

U.S. PATENT DOCUMENTS

| | | | |
|---|---|---|---|
| 497,876 A | 5/1893 | Higham | |
| 3,802,641 A | 4/1974 | Saito | |
| 4,623,104 A * | 11/1986 | Mori | B60R 22/34 |
| | | | 242/384 |

(Continued)

FOREIGN PATENT DOCUMENTS

| | | |
|---|---|---|
| CN | 1919661 A | 2/2007 |
| JP | S4956623 U | 5/1974 |

(Continued)

*Primary Examiner* — Victoria P Augustine
*Assistant Examiner* — Henrix Soto
(74) *Attorney, Agent, or Firm* — Best & Flanagan LLP

(57) ABSTRACT

A reinforced spool assembly has a shaft, a spool member
coaxially mounted around the shaft, and two ratchets
mounted on two axial ends of a combination of the shaft and
the spool member. Each one of two ratchets has a body
having an inner surface. The two inner surfaces of the two
bodies face each other. In each one of the ratchets, the body
has a reinforced supporting structure. The reinforced sup-
porting structure is located between the shaft and the spool
member and is offset from the inner surface of the body. A
reference plane is defined on and extends along the inner
surface of the body, is perpendicular to a central axis of the
shaft, and passes through the reinforced supporting struc-
ture. Mechanical strength of the reinforced spool assembly
is increased by the reinforced supporting structure.

3 Claims, 11 Drawing Sheets

(56) References Cited

U.S. PATENT DOCUMENTS

| | | | | | |
|---|---|---|---|---|---|
| 4,967,976 A * | 11/1990 | Kawai | B60R 22/34 | | |
| | | | 242/376 | | |
| 4,974,876 A * | 12/1990 | Svensson | B60R 22/34 | | |
| | | | 280/808 | | |
| 5,533,756 A * | 7/1996 | Dybro | B60R 22/3413 | | |
| | | | 280/806 | | |
| 5,722,611 A * | 3/1998 | Schmid | B60R 22/3413 | | |
| | | | 242/376 | | |
| 5,785,269 A * | 7/1998 | Miller, III | B60R 22/3413 | | |
| | | | 280/805 | | |
| 5,799,893 A * | 9/1998 | Miller, III | B60R 22/3413 | | |
| | | | 280/805 | | |
| 5,820,058 A * | 10/1998 | Hirzel | B60R 22/3413 | | |
| | | | 242/379.1 | | |
| 5,836,534 A * | 11/1998 | Bohmler | B60R 22/3413 | | |
| | | | 242/379.1 | | |
| 6,299,091 B1 * | 10/2001 | Blackadder | B60R 22/3413 | | |
| | | | 242/379 | | |
| 6,336,606 B1 * | 1/2002 | Smithson | B60R 22/34 | | |
| | | | 242/376 | | |
| 6,609,672 B2 * | 8/2003 | Bell | B60R 22/3413 | | |
| | | | 242/376 | | |
| 2003/0010858 A1 * | 1/2003 | Wier | B60R 22/3413 | | |
| | | | 242/376 | | |
| 2005/0087641 A1 * | 4/2005 | Bell | B60R 22/3413 | | |
| | | | 242/379.1 | | |
| 2011/0309179 A1 * | 12/2011 | Yanagawa | B60R 22/38 | | |
| | | | 242/374 | | |
| 2015/0210247 A1 | 7/2015 | Liu | | | |
| 2015/0232062 A1 * | 8/2015 | Scheuermann | B60R 22/34 | | |
| | | | 242/407 | | |
| 2020/0324722 A1 | 10/2020 | Grasi et al. | | | |

FOREIGN PATENT DOCUMENTS

| | | | | |
|---|---|---|---|---|
| JP | H01102052 U | | 7/1989 | |
| JP | H09193741 A | | 7/1997 | |
| JP | 2006256514 A | * | 9/2006 | |
| JP | 2010058655 A | * | 3/2010 | |
| TW | 200626399 A | | 8/2006 | |
| WO | WO-2012117610 A1 | * | 9/2012 | B60R 22/341 |

* cited by examiner

REINFORCED SPOOL ASSEMBLY

BACKGROUND OF THE INVENTION

1. Field of the Invention

The present invention relates to a retractor of a seat belt system or a tie-down of a wheelchair, and more particularly to a reinforced spool assembly, which is connected to a webbing, in the retractor.

2. Description of Related Art

In a seat belt system of a vehicle, a webbing fastened on a vehicle occupant is connected to a conventional retractor for ensuring safety of the occupant. In emergency, the webbing connected to the spool assembly of the conventional retractor can be locked and is in a tensioned state for fastening a body of the vehicle occupant.

In the conventional retractor, the spool assembly is connected to the webbing and is locked by a brake assembly. With reference to FIGS. 8 to 10, the spool assembly has a shaft 60, a spool member 70 coaxially mounted around the shaft 60, and two ratchets 80 fixed on two axial ends of a combination of the shaft 60 and the spool member 70. The webbing is connected to the spool member 70. The two ratchets 80 can be locked or unlocked by the brake assembly. The conventional retractor is used in the seat belt system of the vehicle that provides safety protection for the vehicle occupant. The strength of the spool assembly of the conventional retractor can sustain the loading that the webbing applies to the spool member 70.

When the conventional spool assembly is used as a tie-down of a heavy wheelchair in a vehicle, under a high load, especially in case of a collision of the vehicle, the strength of the conventional spool assembly is inadequate, and is prone to failure. The webbing connected to the spool member 70 of the spool assembly is loaded and is in under tension. The loading exerted by the webbing on the spool member 70 includes radial loading, linear loading, torque, and bending. FIGS. 11 and 12 show that the radial loading is exerted on the spool member 70 of the spool assembly at different positions. Radial force is borne by the spool member 70 and spool tabs 71 of the spool member 70, wherein end portions of each one of the spool tabs 71 are connected to the two ratchets 80. FIGS. 13 and 14 show that the linear loading is exerted on the spool member of the spool assembly at different positions. Linear force is borne by a combination of the shaft 60 and the spool tabs 71 of the spool member 70. As shown in FIG. 15, when the torque is exerted on the spool member 70 of the spool assembly, torque loading is borne by the spool tabs 71 of the spool member 70. FIG. 16 shows a state in which the spool member 70 of the spool assembly bears the loading exerted by bending.

As mentioned above, the stress on the spool tabs 71 connected to the ratchets 80 resulting from the radial force exerted on the spool assembly is not the same as the stress on the spool tabs 71 resulting from the linear force. With reference to FIGS. 11 and 12, shear stress generated by the radial force on the spool member 70 is almost evenly distributed along a periphery of the spool member 70. One exception is that the spool member 70 is mostly a tube having a slot. The area with greater stress is located at two ends of the spool member 70 facing an axial slot 72.

Shear stress generated by the linear force on the spool member 70 is substantially evenly distributed on the opposite side of a pulling direction of a pulling force applied by the webbing 90 to the spool member 70. With reference to FIGS. 13 and 14, when the pulling direction is upward, the shear stress is located on a lower half of the spool member 70 and is changeable with a relative distance between the axial slot 72 of the spool member 70 and the webbing 90. With reference to FIG. 13, the lower half of the spool member 70 is borne by two of the spool tabs 71, and the stress borne by each of the two spool tabs 71 is greater. With reference to FIG. 14, the lower half of the spool member 70 is borne by three of the spool tabs 71, and the stress borne by each of the three spool tabs 71 is less.

As known from the above analysis of the stress borne by the spool assembly under a tensioned state of the webbing 90, a fixing connecting structure between each one of the spool tabs 71 and a body of each one of the two ratchets 80 is crucial regarding whether the mechanical strength of the reinforced spool assembly can sustain the loadings.

In the conventional spool assembly, the spool tabs 71 at two axial ends of the spool member 70 are riveted and fixed to the bodies of the two ratchets 80. A body of the spool member 70 and a connecting portion between the adjacent spool tabs 71 at the two axial ends of the combination of the shaft 60 and the spool member 70 cannot be supported substantively. Even though the spool tabs 71 riveted on the ratchets 80 are further welded with outer surfaces of the bodies of the ratchets 80, the ratchets 80 support the spool tabs 71 merely in radial positions of supporting portions, which are located between the shaft 60 and the spool tabs 71 of the spool member 70, of the bodies of the ratchets 80. With reference to FIG. 10, a shear line L1, which acts on the spool tabs 71 of the spool member 70 and is located at an inner surface of one of the ratchets and the supporting portions, is perpendicular to a central axis of the shaft 60. A cross-sectional area of the loading is too small. When the conventional spool assembly is used as a tie-down of a heavy wheelchair, during an accident, the heavy wheelchair is trusted forward and the webbing 90 is tensioned to generate the loading on the spool member 70 of the spool assembly. This could easily cause that unit-area stresses in fixing portions between the ratchets 80 and the spool member 70 are too large. The mechanical strength of the conventional spool assembly may be insufficient to withstand the high loading generated by the heavy wheelchair, such that the spool assembly of the tie down mechanism is prone to deformation or breakage. In order to prevent such a failure, it is necessary to improve a structure of the conventional spool assembly.

SUMMARY OF THE INVENTION

The objective of the invention is to provide a reinforced spool assembly that can solve the problem that the mechanical strength of the conventional spool assembly of wheelchair tie down cannot sufficiently withstand the high loading created by a heavy wheelchair during an accident.

The reinforced spool assembly has a shaft, a spool member, and two ratchets. The spool member is coaxially mounted around the shaft. A spacing is formed between an inner wall of the spool member and an outer wall of the shaft. Each one of the two ratchets has a body having an inner surface and multiple teeth formed around a periphery of the body. Two axial ends of a combination of the shaft and the spool member are inserted into and fixed on the two bodies of the two ratchets. The two inner surfaces of the two bodies face each other.

In each one of the two ratchets, the body has a reinforced supporting structure. The reinforced supporting structure, the body and the teeth are integrally formed as a single part. The reinforced supporting structure is located between and abuts against the outer wall of the shaft and the inner wall of the spool member. The reinforced supporting structure is offset from the inner surface of the body. An imaginary extension plane of the inner surface of the body is perpendicular to a central axis of the shaft and passes through the reinforced supporting structure.

The reinforced supporting structure of the body of each one of the two ratchets has: an inner sidewall facing the inner sidewall of the reinforced supporting structure of the body of the other ratchet; and an outer sidewall defined opposite to the inner sidewall of the reinforced supporting structure and recessed in the body. An inner offset distance is defined between the inner sidewall of the reinforced supporting structure and the inner surface of the body. An outer offset distance is defined between the outer sidewall of the reinforced supporting structure and the outer surface of the body. The inner offset distance is the same as the outer offset distance.

The reinforced spool assembly can be adapted to a retractor of a seat belt system or a tie down of a heavy wheelchair and has the following advantages:
1. Good mechanical strength for bearing high loading: the reinforced supporting structures of the two ratchets, which are disposed on the two axial ends of the combination of the shaft and the spool member coaxially mounted around the shaft, are disposed on the two bodies between the shaft and the spool member. In each one of the two bodies of the two ratchets, the reinforced supporting structure is offset from the inner surface of the body, so the imaginary extension plane of the inner surface of the body passes through the reinforced supporting structure, which strengthen the structure. Loading applied on the spool member can be effectively distributed on a larger cross-sectional area. The stress per unit area between the ratchets and the spool member is reduced. Mechanical strength of the reinforced spool assembly is good in bearing high load.
2. Ease of manufacture of the reinforced supporting structure of the reinforce spool assembly: in each one of the two bodies of the two ratchets, the reinforced supporting structure of the body is disposed between the shaft and the spool member. The reinforced supporting structure is offset from the inner surface of the body. The reinforced supporting structure can be completed by extrusion during the stamping process of the ratchets. Therefore, it is easy to complete the reinforced supporting structure in the manufacturing process of the reinforce spool assembly.

The spool member has a rough non-slip surface formed on an outer surface of the spool member for ensuring connection stability between the spool member and a distal end of a webbing. The webbing can remain flat and evenly apply a loading to the spool member.

DETAILED DESCRIPTION OF THE PREFERRED EMBODIMENT

Figures 1, 2:
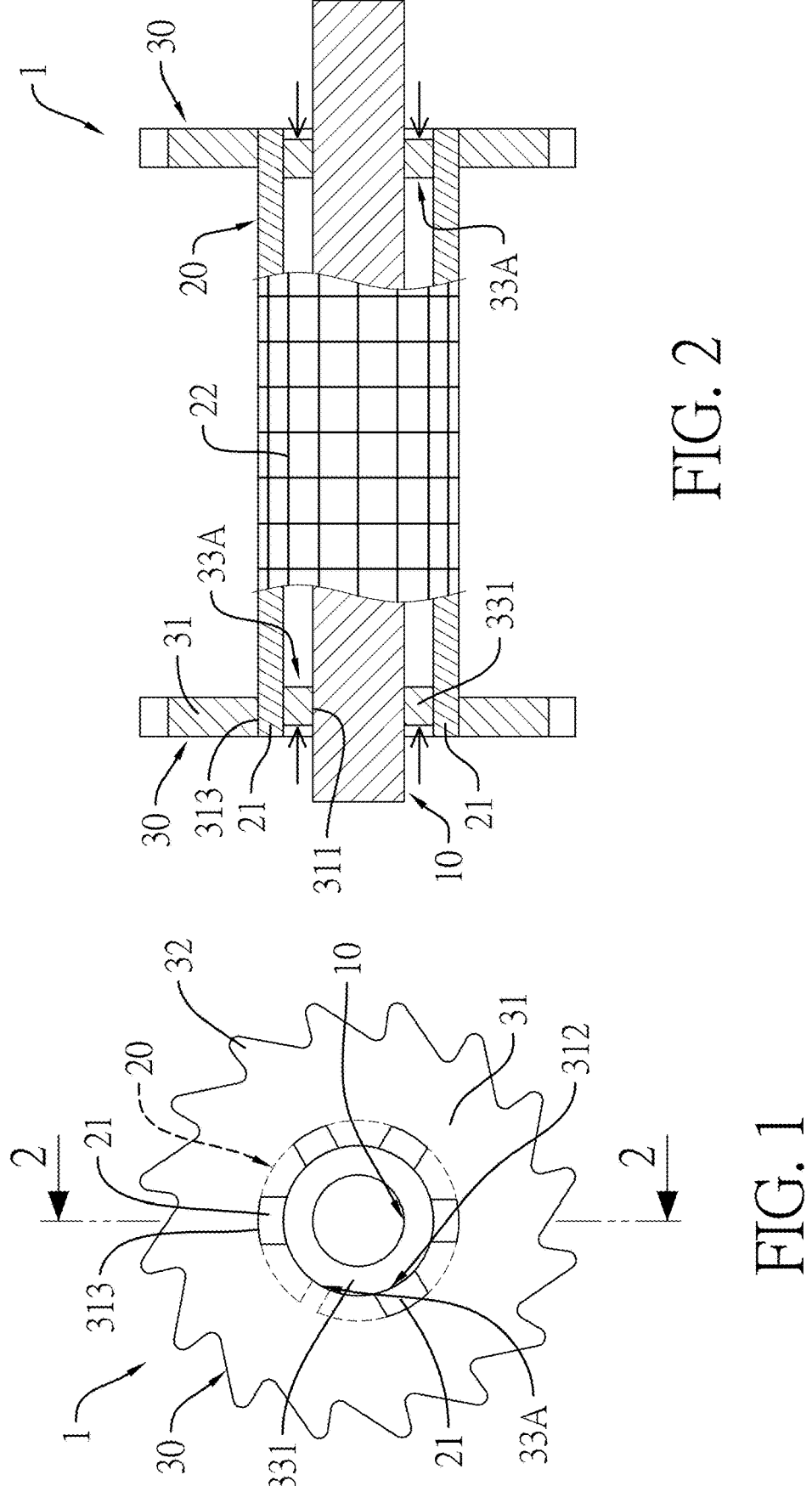
FIG. 1 is a side view of a first embodiment of a reinforced spool assembly in accordance with the present invention.
FIG. 2 is a cross sectional side view in partial section of the reinforced spool assembly along line 2-2 in FIG. 1.
Figures 4, 5:
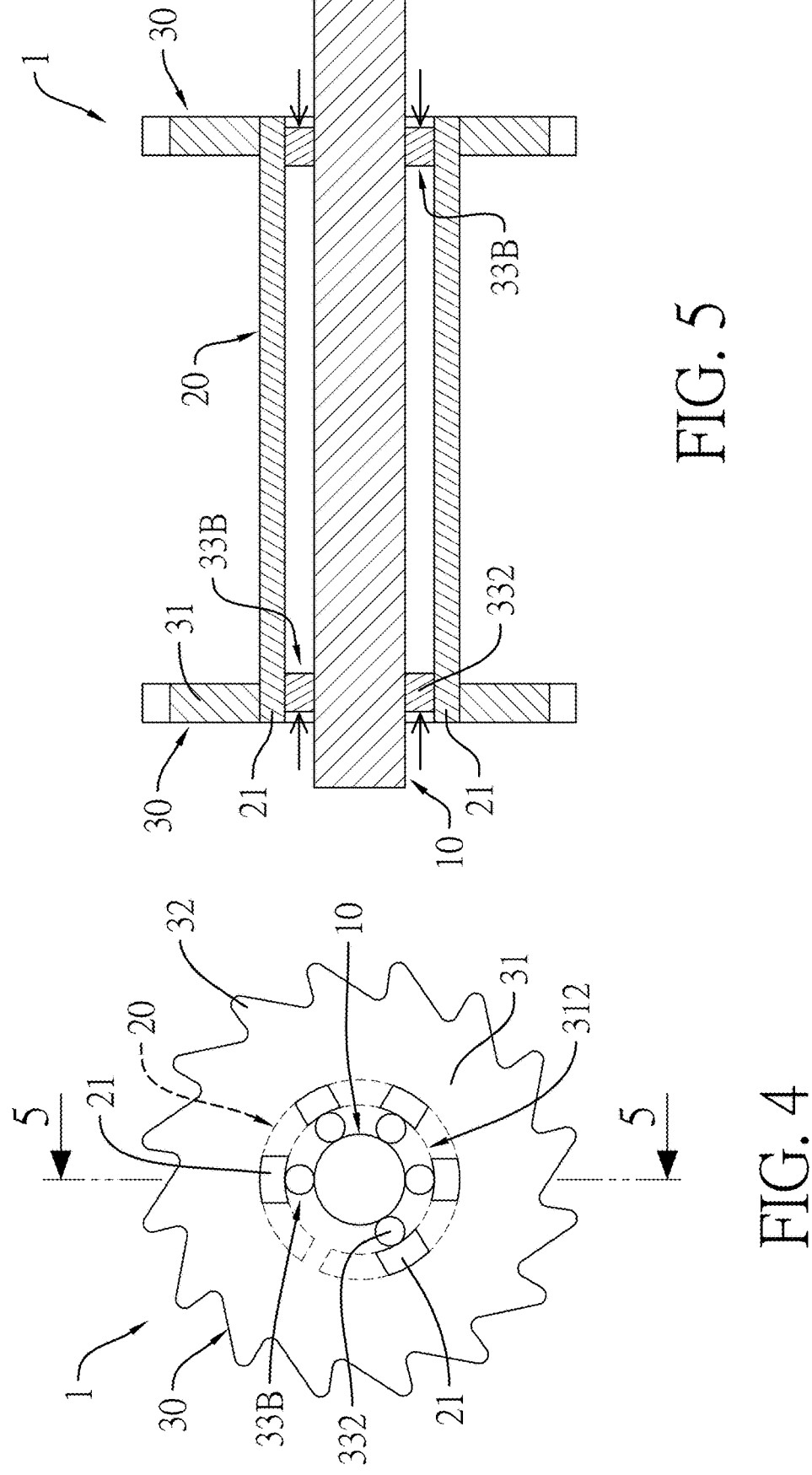
FIG. 4 is a side view of a second embodiment of a reinforced spool assembly in accordance with the present invention.
FIG. 5 is a cross sectional side view in partial section of the reinforced spool assembly along line 5-5 in FIG. 4.

With reference to FIGS. 1 and 4, a first embodiment and a second embodiment of a reinforced spool assembly 1 in accordance with the present invention comprises a shaft 10, a spool member 20, and two ratchets 30.

With reference to FIGS. 1-3 and FIGS. 4-6, the shaft 10 is a circular rod with a predetermined length. The shaft 10 has a central axis 100 extending along an axial direction of the shaft 10.

With reference to FIGS. 1-3 and FIGS. 4-6, the spool member 20 is a circular tube with a predetermined length. The spool member 20 is coaxially mounted around the shaft 10. An inner diameter of the spool member 20 is larger than an outer diameter of the shaft 10. A spacing is formed between an inner wall of the spool member 20 and an outer wall of the shaft 10. The spacing is set according to product requirements for the reinforced spool assembly 1. The spool member 20 has multiple spool tabs 21 formed on two axial ends of the spool member 20 and located around the shaft 10 at spaced intervals.

With reference to FIGS. 1 and 4, the spool member 20 is a circular tube, which is formed by bending a metal plate, having a slot. The slot of the circular tube extends axially. A distance between two adjacent spool tabs 21 adjacent the slot is relatively wider, and a distance between the other two adjacent spool tabs 21 is relatively narrower. With reference to FIG. 2, a rough, non-slip surface 22 is formed on an outer surface of the spool member 20 for ensuring connection stability between the spool member 20 and a webbing 5. The webbing 5 can remain flat and evenly apply a loading to the spool member 20.

With reference to FIGS. 1-3 and FIGS. 4-6, the two ratchets 30 are respectively and fixedly mounted on two axial ends of a combination of the shaft 10 and the spool member 20, such that the two ratchets 30 are rotatable along with the spool member 20. Each one of the two ratchets 30 has a body 31 multiple teeth 32 formed around a periphery of the body 31. The body 31 has an inner surface 31a and an outer surface 31b opposite to the inner surface 31a. The inner surface 31a is perpendicular to a central axis 100 of the shaft 10. In the two ratchets 30, the two inner surfaces 31a of the two bodies 31 face each other. In each one of the two ratchets 30, an imaginary extension plane 310 is perpendicular to the central axis 100 of the shaft 10. The body 31 has a reinforced supporting structure 33A, 33B. The reinforced supporting structure 33A, 33B, the body 31 and the teeth 32 are integrally formed as a single part. The reinforced supporting structure 33A, 33B is located between the outer wall of the shaft 10 and the inner wall of the spool member 20 and has an inner sidewall 333 and an outer sidewall 334. The inner sidewall 333 of the reinforced supporting structure 33A, 33B faces the inner sidewall 333 of the reinforced supporting structure 33A, 33B of the body 31 of the other ratchet 30. That is, the inner sidewall 333 of the reinforced supporting structure 33A, 33B faces toward the middle of the shaft 10. The outer sidewall 334 of the reinforced supporting structure 33A, 33B is defined opposite to the inner sidewall 333 of the reinforced supporting structure 33A, 33B and is and recessed in the body 31. The reinforced supporting structure 33A, 33B is offset from the inner surface 31a of the body 31. An inner offset distance d1A, d1B is defined between the inner sidewall 333 of the reinforced supporting structure 33A, 33B and the inner surface 31a of the body 31. An outer offset distance d2A, d2B is defined between the outer sidewall 334 of the reinforced supporting structure 33A, 33B and the outer surface 31b of the body 31. The inner offset distance d1A, d1B is the same as the outer offset distance d2A, d2B. The imaginary extension plane 310 passes through the reinforced supporting structure 33A, 33B.

Figure 3:
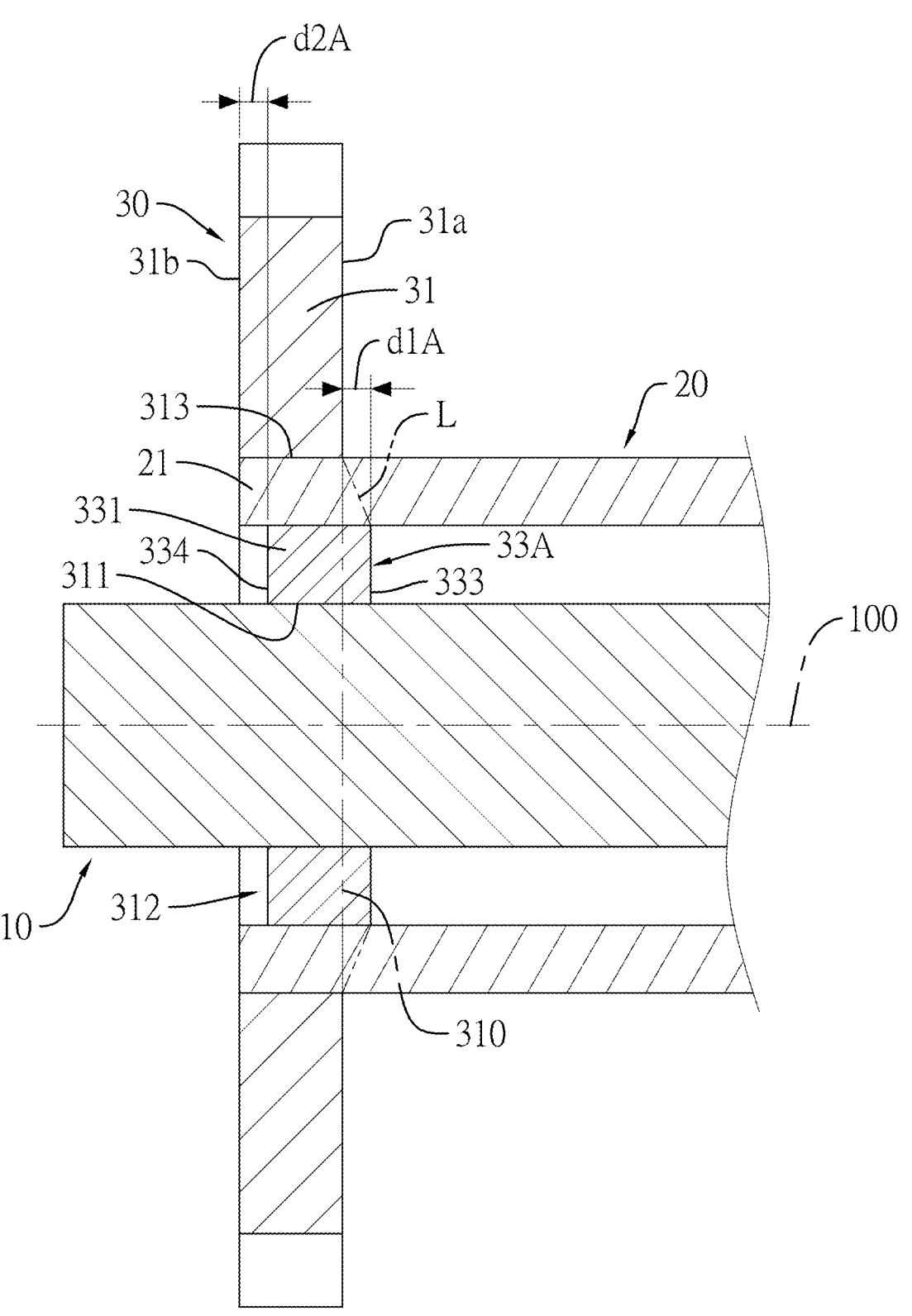
FIG. 3 is an enlarged side view of the reinforced spool assembly in FIG. 2.
Figure 6:
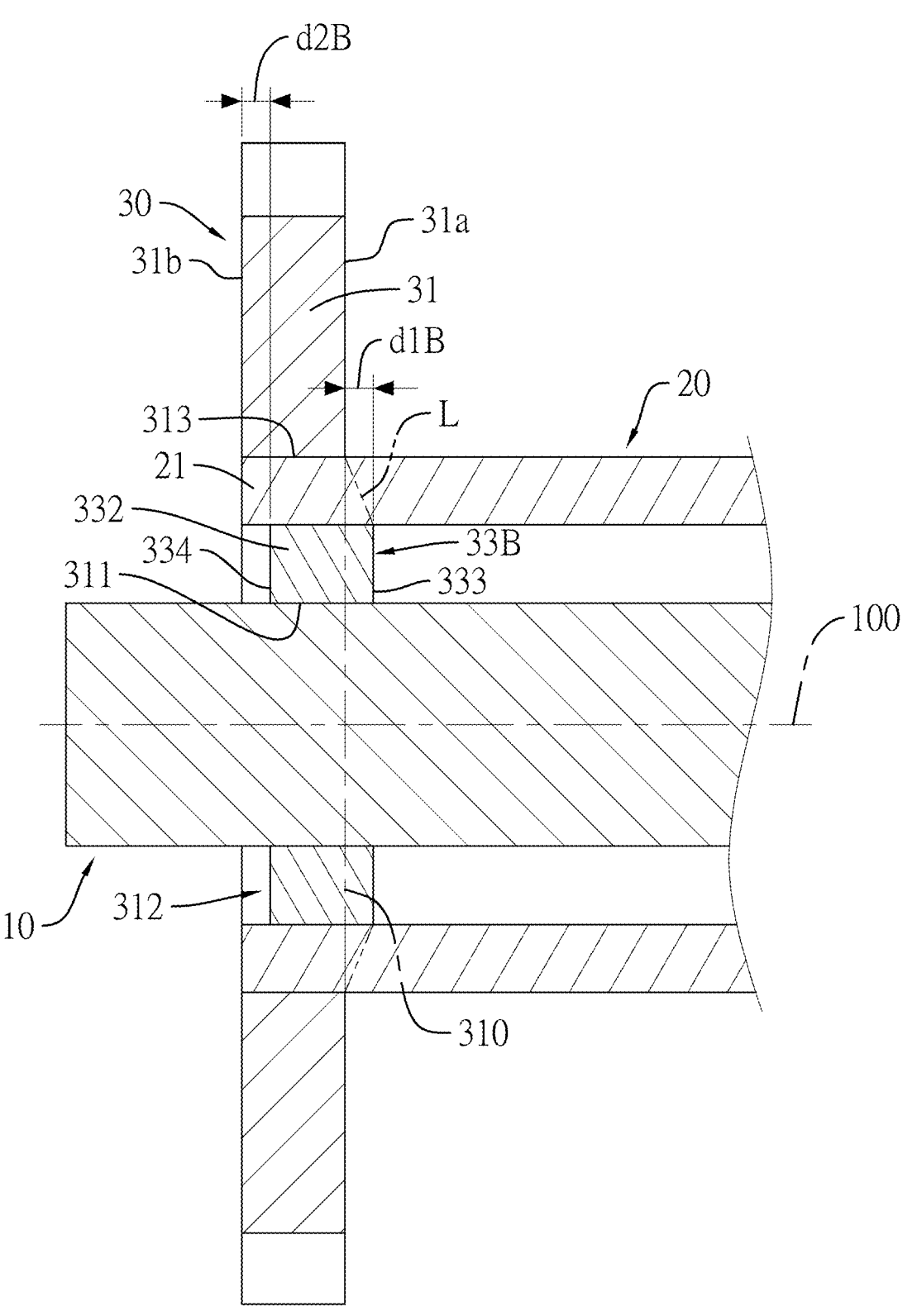
FIG. 6 is an enlarged side view of the reinforced spool assembly in FIG.
Figure 7:
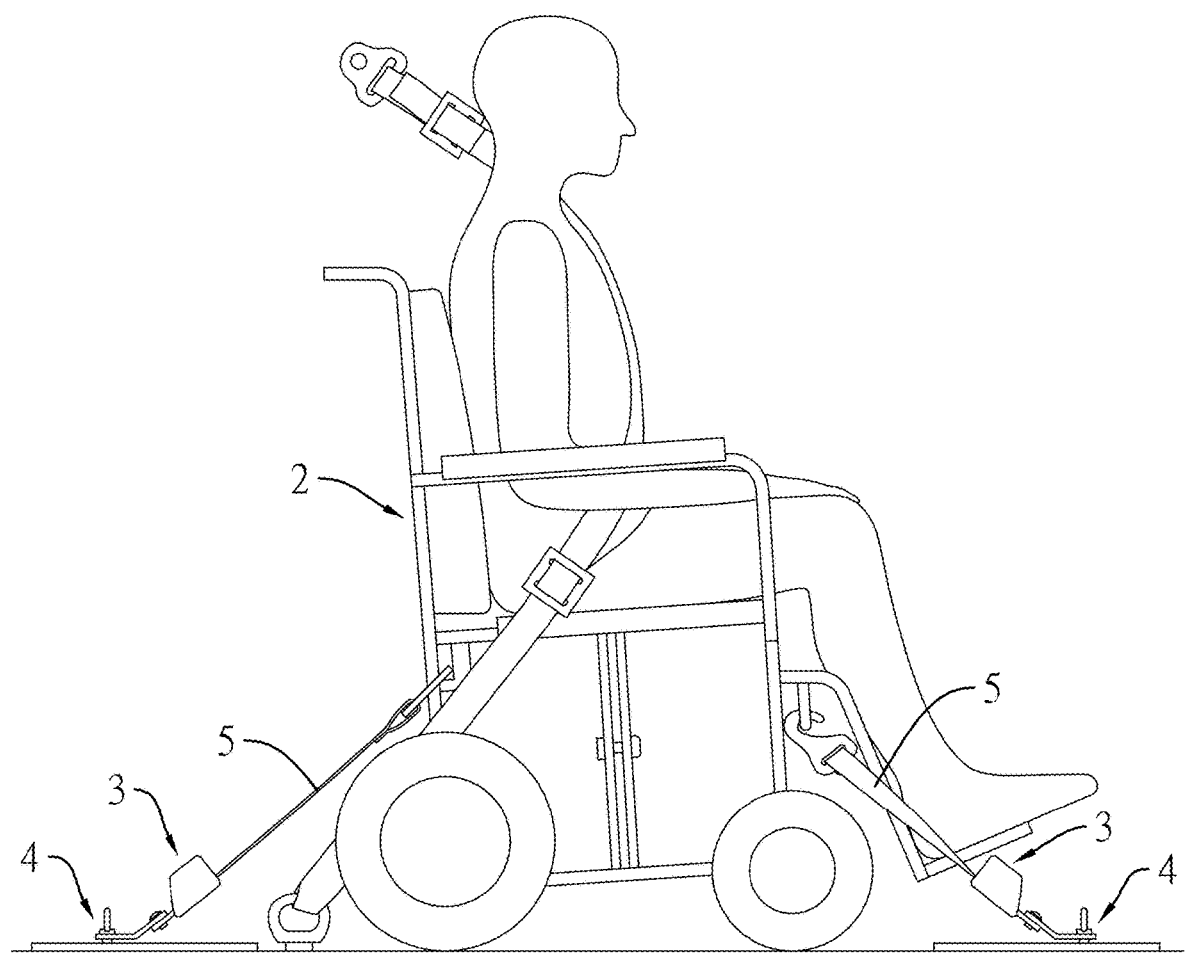
FIG. 7 is an operational side view of the reinforced spool assembly, showing a retractor having the reinforced spool assembly is applied to fix a reinforced tie-down.
Figure 9:
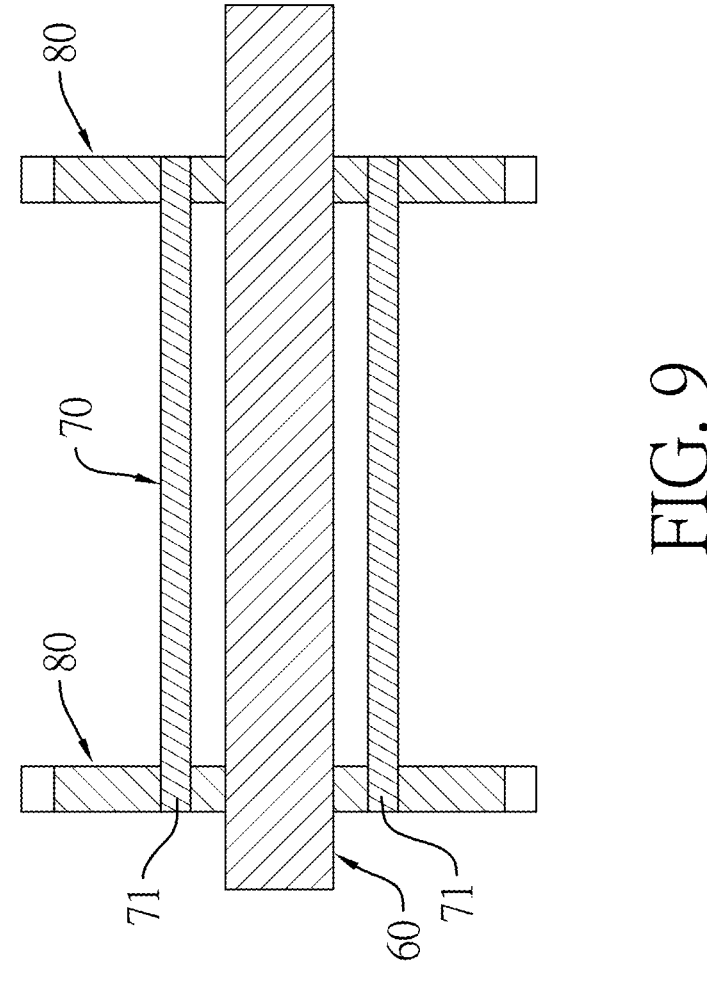
FIG. 9 is a cross sectional side view in partial section of the conventional spool assembly along line 9-9 in FIG. 8.
Figure 8:
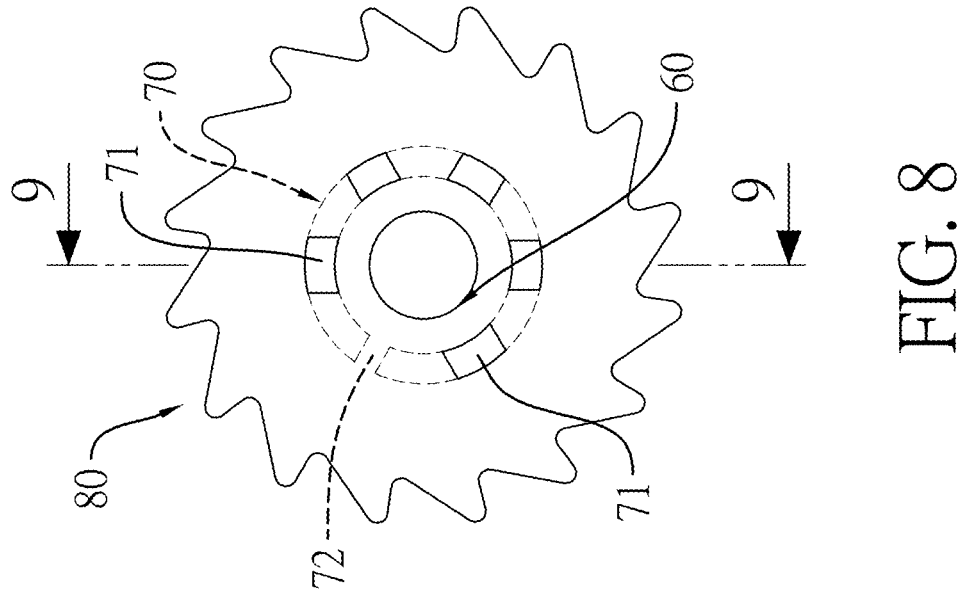
FIG. 8 is a side view of a conventional spool assembly in accordance with the prior art.
Figure 10:
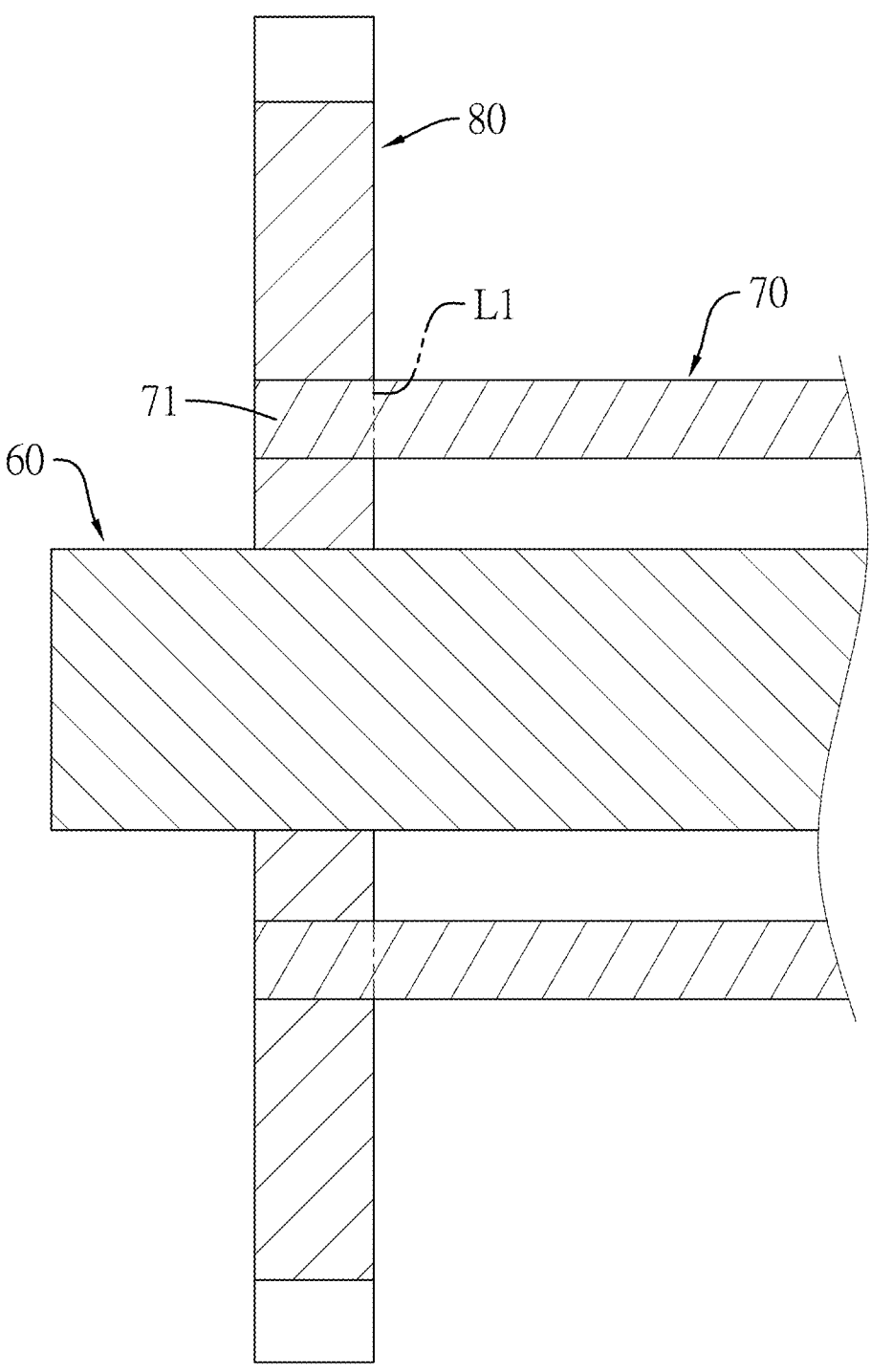
FIG. 10 is an enlarged side view of the conventional spool assembly in FIG. 9.
Figure 12:
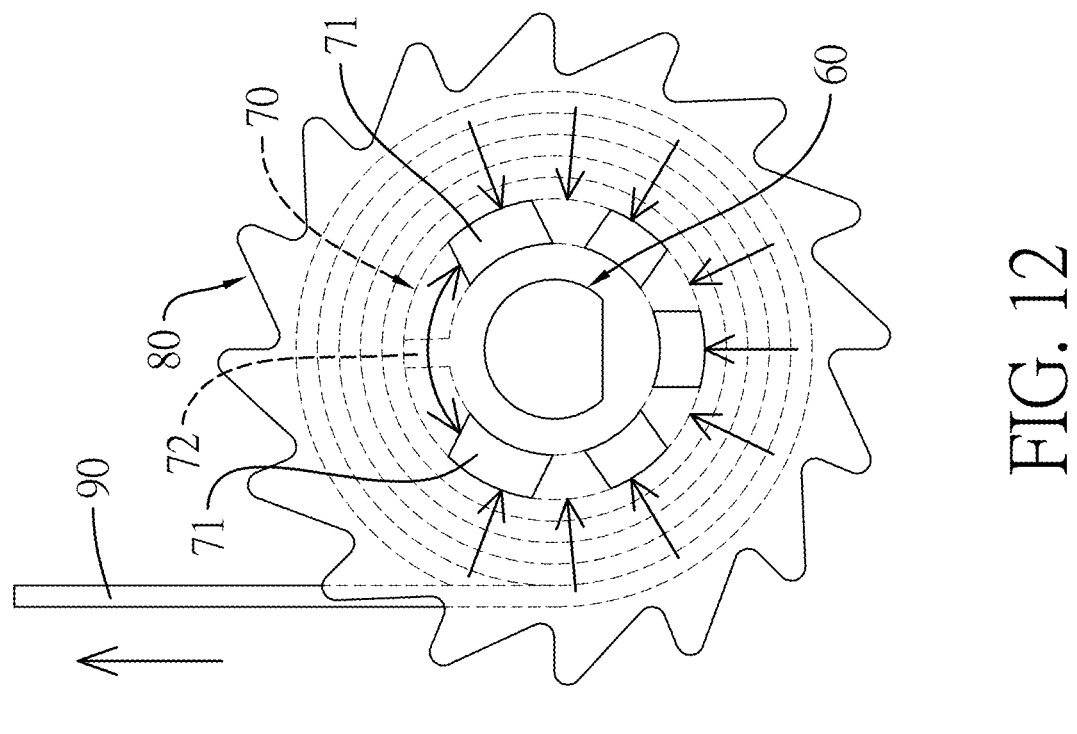
FIG. 12 is another operational side view of the conventional spool assembly in FIG. 8, showing radial loading exerted on the spool member.
Figure 11:
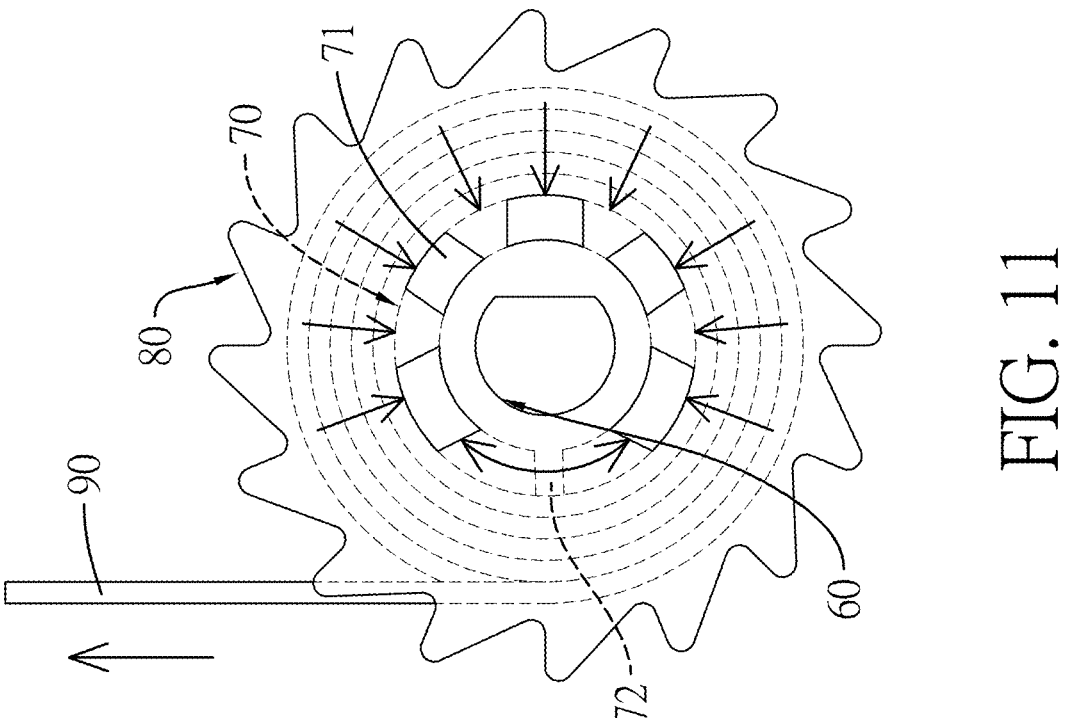
FIG. 11 is an operational side view of the conventional spool assembly in FIG. 8, showing radial loading exerted on a spool member.
Figures 13, 14:
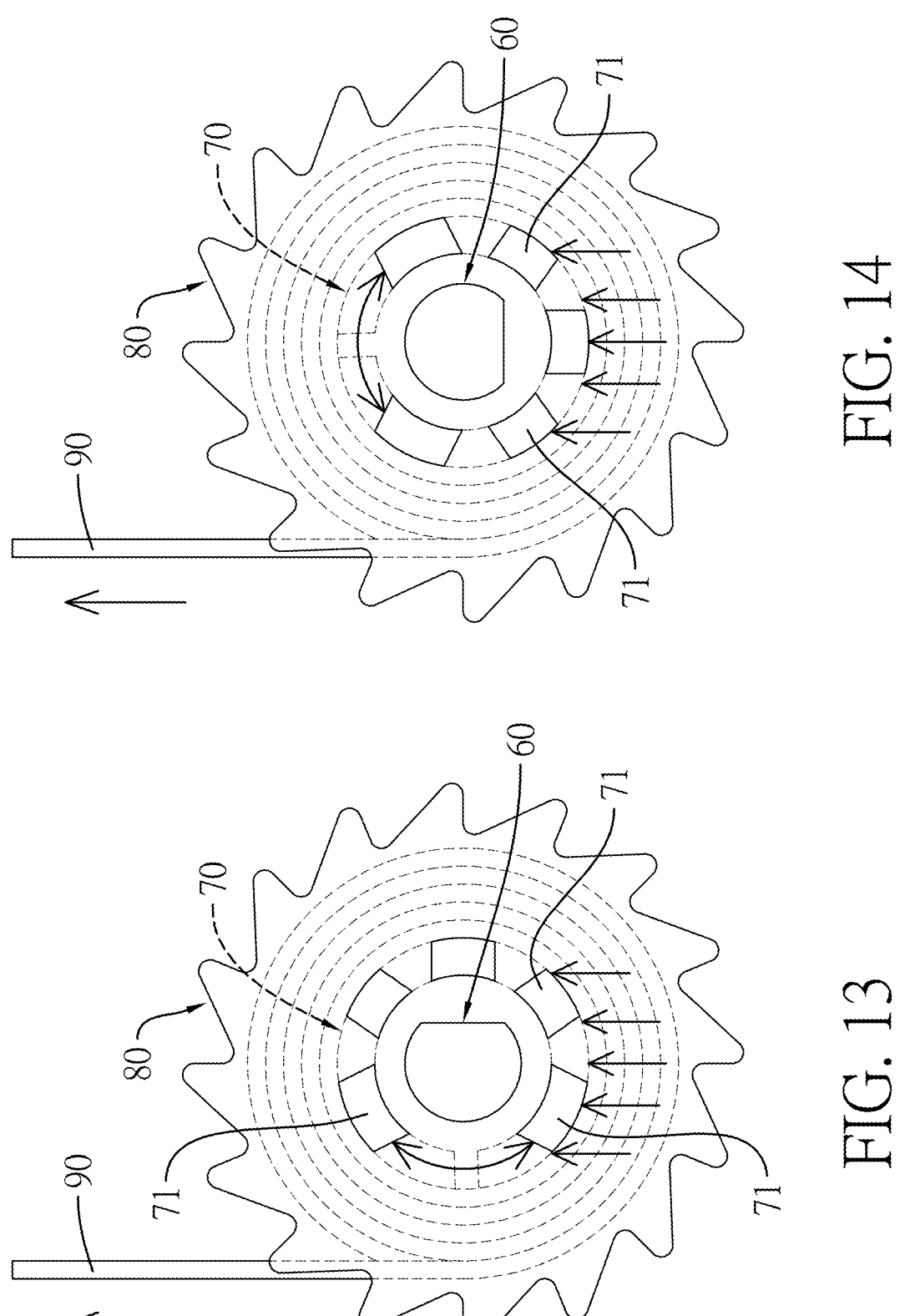
FIG. 13 is an operational side view of the conventional spool assembly in FIG. 8, showing linear loading exerted on the spool member.
FIG. 14 is another operational side view of the conventional spool assembly in FIG. 8, showing linear loading exerted on the spool member.
Figure 15:
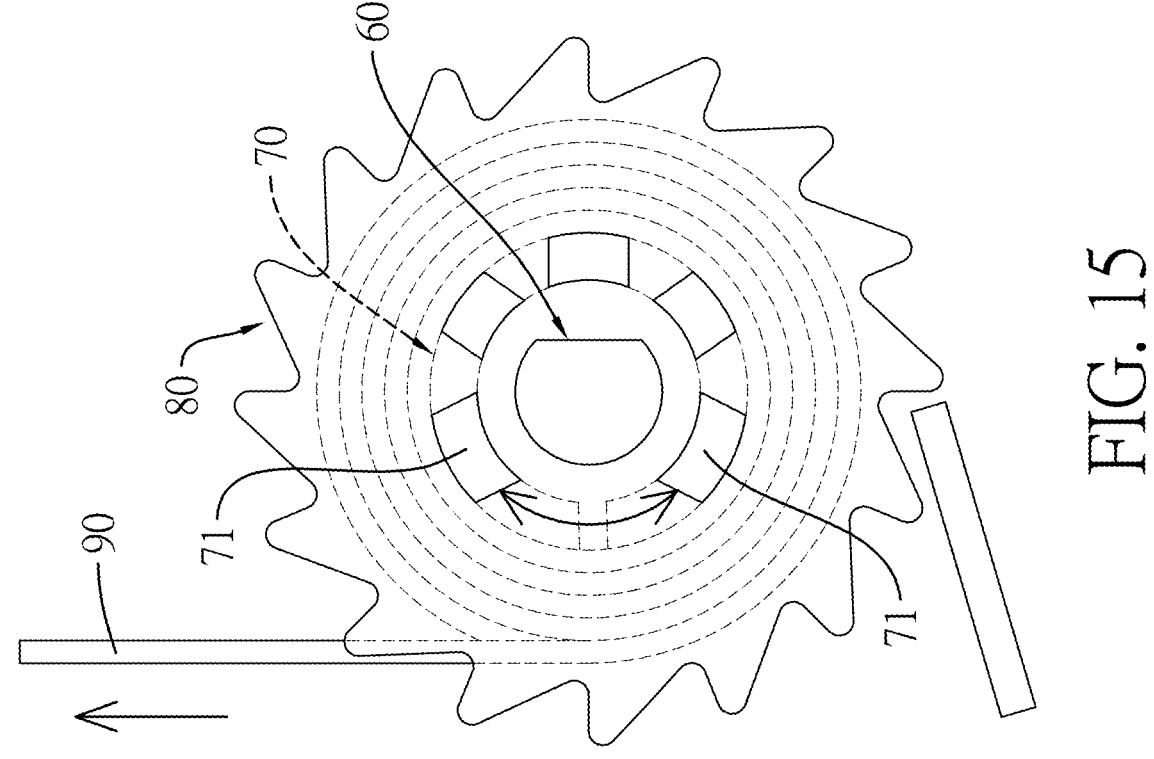
FIG. 15 is an operational side view of the conventional spool assembly in FIG. 8, showing torque exerted on the spool member.
Figure 16:
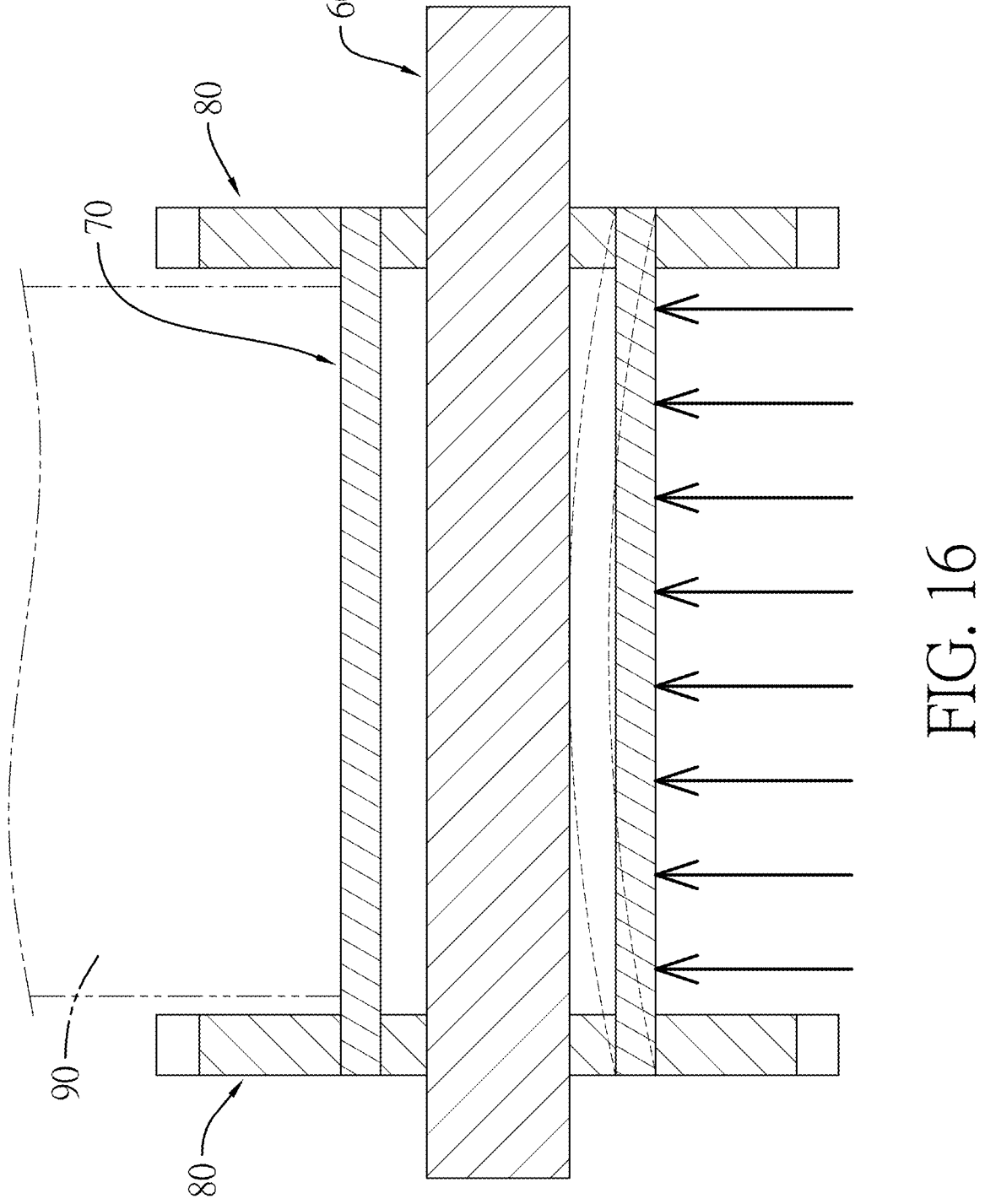
FIG. 16 is a cross sectional side view of the conventional spool assembly in FIG. 9, showing the spool member bears the bending loading.

With reference to FIGS. 3 and 6, in each one of the two ratchets 30, the reinforced supporting structure 33A, 33B is offset from the inner surface 31a of the body 31. The imaginary extension plane 310, which extends along the inner surface 31a of the body 31 and is perpendicular to the central axis 100 of the shaft 10, passes through the reinforced supporting structure 33A, 33B. Shear line L, which acts on the spool tabs 21 of the spool member 20, is located at the inner surface 31a of the body 31, and extends to an inner surface of the reinforced supporting structure 33A, 33B, is offset and inclined for increasing a cross-sectional area. Load acting on the spool tabs 21 is effectively distributed on the larger cross-section area. Stress per unit area in a conjunction between each one of the ratchets 30 and the spool member 20 is reduced. Mechanical strength of the reinforced spool assembly is increased in bearing higher loadings.

Based on the above-mentioned conception, the reinforced supporting 33A, 33B of the reinforced spool assembly 1 can be utilized in many feasible embodiments. For ease and conciseness in description, technical features of the reinforced spool assembly 1 are elaborated in conjunction with the drawings of the preferred embodiments, but not limited thereto.

With reference to FIGS. 1-3 and FIGS. 4-6, in each one of the two ratchets 30, the body 31 has a center hole 311 located at a center of the body 31, a supporting area 312 located around the center hole 311, and multiple fixing holes 313 disposed around the supporting area 312. An edge of each one of the fixing holes 313 is adjacent to an outer periphery of the supporting area 312. Two axial ends of the shaft 10 are respectively and fixedly inserted into the two center holes 311 of the two ratchets 30. The spool tabs 21 located on the two axial ends of the spool member 20 are respectively and fixedly inserted into the fixing holes 313 of the bodies 31 of the two ratchets 30.

With reference to FIGS. 1 to 3, in each one of the two bodies of the two ratchets 30, the reinforced supporting structure 33A has a supporting ring 331 mounted around the shaft 10 and located in the supporting area 312, which is between the shaft 10 and the spool tabs 21 of the spool member 20. A side surface of the supporting ring 331 faces a middle of the shaft 10 and is offset from the inner surface 31a of the body 31. The center hole 311 is located on the supporting ring 331 and is offset from a side, which faces the middle of the shaft 10, of each one of the fixing holes 313. The supporting ring 331 abuts against the shaft 10 and the spool tabs 21 of the spool member 20.

With reference to FIGS. 4 to 6, in each one of the two ratchets 30, the reinforced supporting structure 33B has multiple supporting blocks 332 surrounding the supporting area 312. Each one of the supporting blocks 332 has a side surface. The side surface of the supporting block 332 faces the middle of the shaft 10. The supporting blocks 332 and the spool tabs 21 are equal in amount, and the supporting blocks 332 respectively correspond to the spool tabs 21 in position. Each one of the supporting blocks 332 is offset from the inner surface 31a of the body 31, is located in the supporting area 312, and is located between the shaft 10 and the corresponding spool tab 21. Preferably, each one of the supporting blocks 332 abuts against the shaft 10 and the corresponding spool tab 21 of the spool member 20.

The amounts of the supporting blocks 332 and the spool tabs 21 can also be different in other embodiments, and the supporting blocks 332 can be not positioned corresponding to the spool tabs 21. Increasing the amount the supporting blocks 332 can enhance the support.

As mentioned above, the mechanical strength of the reinforced spool assembly 1 is obviously enhanced. The reinforced spool assembly 1 is not only applicable to a retractor of a seat belt system in a vehicle for protecting an occupant. With reference to FIGS. 3 and 6, the ratchets 30 of the reinforced spool assembly 1 are locked by a brake assembly of the retractor. The webbing 5 fastened on the wheelchair is in a tensioned state. The spool member 20 connected to the webbing 5 has the reinforced supporting structures 33A, 33B disposed on the two bodies 31 of the two ratchets 30 for effectively distributing the loading exerted on the spool tabs 21 on the larger cross-section area. Stress per unit area between the ratchets 30 and the spool member 20 is reduced. The mechanical strength of the reinforced spool assembly 1 is increased in bearing higher loadings, sufficiently satisfying safety requirements for the retractor of the seat belt system.

In addition, the reinforced spool assembly 1 is also used in a tie-down 3 fixing a heavy wheelchair 2 carried by vehicles, such as rehabilitation buses and public transportation vehicles allowed to carry wheelchairs. The tie-down 3 having the reinforced spool assembly 1 is mounted on a floor of the vehicle by a fixed fixing mechanism or a fixing mechanism 4. The webbing 5 connected to the reinforced spool assembly 1 is pulled out of a shell of the tie-down 3. A clasp mounted on a distal end of the webbing 5 is hooked to a frame of the heavy wheelchair 2. Four tie-downs 3 are disposed at two sides of a front end and a rear end of the heavy wheelchair 2 for fixing the heavy wheelchair 2 on the floor of the vehicle. During transportation, the four tie-downs 3 disposed around the heavy wheelchair 2 provide a balanced and stable traction force to ensure that the heavy wheelchair 2 remains fixed to the floor of the vehicle.

When the heavy wheelchair is moved relative to the vehicle, the webbing 5 connected to the heavy wheelchair 2 is forced into a tensioned state, generating a high loading on the reinforced spool assembly of the tie-down 3. With reference to FIGS. 3 and 6, each one of the reinforced supporting structures 33A, 33B is offset from the inner surface 31*a* of a corresponding one of the two ratchets 30. The imaginary extension plane 310 is perpendicular to the central axis 100 of the shaft 10. Shear line L, which acts on the spool tabs 21 of the spool member 20, is located at the inner surface 31*a* of the body 31, and extends to the inner surface of the reinforced supporting structure 33A, 33B, is offset and inclined for increasing the cross-section area. The load acting on the spool tabs 21 is effectively distributed on the larger cross-section area. The stress per unit area in the connecting part between each one of the ratchets 30 and the spool member 20 is reduced. Mechanical strength of the reinforced spool assembly 1 is increased in bearing high loadings exerted on the reinforced tie-down 3.

What is claimed is:

1. A reinforced spool assembly comprising:
a shaft;
a spool member coaxially mounted around the shaft, wherein a spacing is formed between an inner wall of the spool member and an outer wall of the shaft;
two ratchets, each one of the two ratchets having
a body mounted on and around an outer surface of the spool member and having an inner surface; and
multiple teeth formed around a periphery of the body;
wherein the two inner surfaces of the two bodies face each other, and two axial ends of the shaft protrude through the bodies of the two ratchets respectively; and
wherein the body of each one of the two ratchets has a reinforced supporting structure; the reinforced supporting structure, the body and the teeth are integrally formed as a single part; the reinforced supporting structure is located between and abuts against the outer wall of the shaft and the inner wall of the spool member, the reinforced supporting structure is offset from the inner surface of the body; the reinforced supporting structure has a supporting ring mounted around the shaft, and a side surface of the supporting ring facing a middle of the spool member is offset from the inner surface of the body; an imaginary extension plane of the inner surface of the body is perpendicular to a central axis of the shaft and passes through the reinforced supporting structure;
wherein the reinforced supporting structure of the body of each one of the two ratchets has
an inner sidewall facing the inner sidewall of the reinforced supporting structure of the body of the other ratchet; and
an outer sidewall defined opposite to the inner sidewall of the reinforced supporting structure and recessed in the body; and
an inner offset distance is defined between the inner sidewall of the reinforced supporting structure and the inner surface of the body;

an outer offset distance is defined between the outer sidewall of the reinforced supporting structure and the outer surface of the body; and
the inner offset distance is the same as the outer offset distance;
wherein the spool member has multiple spool tabs formed on two axial ends of the spool member and located around the shaft at spaced intervals;
in each one of the two ratchets, the body has a center hole located at a center of the body, a supporting area located around the center hole, and multiple fixing holes disposed around the supporting area, an edge of each one of the fixing holes is adjacent to an outer periphery of the supporting area; and
the two axial ends of the shaft are respectively and fixedly inserted into the two center holes of the two ratchets, the spool tabs formed on the two axial ends of the spool member are respectively and fixedly inserted into the fixing holes of the bodies of the two ratchets; the supporting ring of the reinforced supporting structure is located at the supporting area and abuts the shaft and the spool tabs of the spool member.

2. The reinforced spool assembly as claimed in claim 1, wherein the spool member has a non-slip surface formed on the outer surface of the spool member.

3. A reinforced spool assembly comprising:
a shaft;
a spool member coaxially mounted around the shaft, wherein a spacing is formed between an inner wall of the spool member and an outer wall of the shaft;
two ratchets, each one of the two ratchets having
a body mounted on and around an outer surface of the spool member and having an inner surface; and
multiple teeth formed around a periphery of the body;
wherein the two inner surfaces of the two bodies face each other, and two axial ends of the shaft protrude through the bodies of the two ratchets respectively; and
wherein the body of each one of the two ratchets has a reinforced supporting structure; the reinforced supporting structure, the body and the teeth are integrally formed as a single part: the reinforced supporting structure is located between and abuts against the outer wall of the shaft and the inner wall of the spool member, the reinforced supporting structure is offset from the inner surface of the body; the reinforced supporting structure has multiple supporting blocks surrounding the shaft, each one of the supporting blocks has a side surface facing a middle of the shaft and offset from the inner surface of the body, and each one of the supporting blocks abuts against the shaft and the spool member; an imaginary extension plane of the inner surface of the body is perpendicular to a central axis of the shaft and passes through the reinforced supporting structure;
wherein the reinforced supporting structure of the body of each one of the two ratchets has
an inner sidewall facing the inner sidewall of the reinforced supporting structure of the body of the other ratchet; and
an outer sidewall defined opposite to the inner sidewall of the reinforced supporting structure and recessed in the body; and
an inner offset distance is defined between the inner sidewall of the reinforced supporting structure and the inner surface of the body;

an outer offset distance is defined between the outer sidewall of the reinforced supporting structure and the outer surface of the body; and the inner offset distance is the same as the outer offset distance;

wherein the spool member has multiple spool tabs formed on two axial ends of the spool member and located around the shaft at spaced intervals;

the body of each one of the two ratchets has a center hole located at a center of the body, a supporting area located around the center hole, and multiple fixing holes disposed around the supporting area, an edge of each one of the fixing holes is adjacent to an outer periphery of the supporting area;

the two axial ends of the shaft are respectively and fixedly inserted into the two center holes of the bodies of the two ratchets, the spool tabs formed on the two axial ends of the spool member are respectively and fixedly inserted into the fixing holes of the bodies of the two ratchets; each one of the supporting blocks of the reinforced supporting structure is located at the supporting area; the supporting blocks and the spool tabs are equal in amount, and the supporting blocks respectively correspond to the spool tabs in position; each one of the supporting blocks abuts between the corresponding spool tab and the shaft.

\*  \*  \*  \*  \*